United States Patent [19]

Krikorian

[11] 3,931,694

[45] Jan. 13, 1976

[54] PLANTING FLAT

[75] Inventor: Peter K. Krikorian, Fresno, Calif.

[73] Assignee: Haig K. Krikorian, Fresno

[22] Filed: June 13, 1974

[21] Appl. No.: 478,951

[52] U.S. Cl.................................. 47/34.13; 47/37
[51] Int. Cl.² ...................... A01G 9/02; A01G 9/10
[58] Field of Search .......... 47/34.13, 34.1, 37, 38.1

[56] References Cited
UNITED STATES PATENTS

| 579,993 | 4/1897 | Mahler................................. 47/34.1 |
| 2,810,234 | 10/1957 | Blackburn et al. .................. 47/34.1 |
| 3,032,927 | 5/1962 | Kobs...................................... 47/37 |
| 3,522,058 | 1/1971 | Fici................................ 47/34.13 X |
| 3,539,071 | 11/1970 | Ludder....................... 47/34.13 UX |
| 3,667,159 | 6/1972 | Todd............................... 47/34.13 |
| D207,174 | 3/1967 | Rowbottam........................... D35/3 |

FOREIGN PATENTS OR APPLICATIONS

| 1,034,256 | 6/1966 | United Kingdom............... 47/34.13 |
| 151,592 | 3/1932 | Switzerland......................... 47/34.1 |
| 930,534 | 7/1963 | United Kingdom............... 47/34.13 |
| 2,017,100 | 10/1970 | Germany .......................... 47/34.13 |

Primary Examiner—Edgar S. Burr
Assistant Examiner—Steven A. Bratlie
Attorney, Agent, or Firm—Huebner & Worrel

[57] ABSTRACT

A planting flat consisting of a unitary plastic body providing a multiplicity of planting cells having open upper ends adapted to receive growing medium, seeds, water, fertilizer, and the like; closed lower ends defining reservoirs for the retention of residual water and fertilizer accessible to the roots of plants grown in the cells; and aerating openings disposed above the reservoirs serving the combined purposes of supplying air to the growing medium and providing drainage of water and fertilizer in excess of an amount sufficient to fill the reservoirs.

2 Claims, 7 Drawing Figures

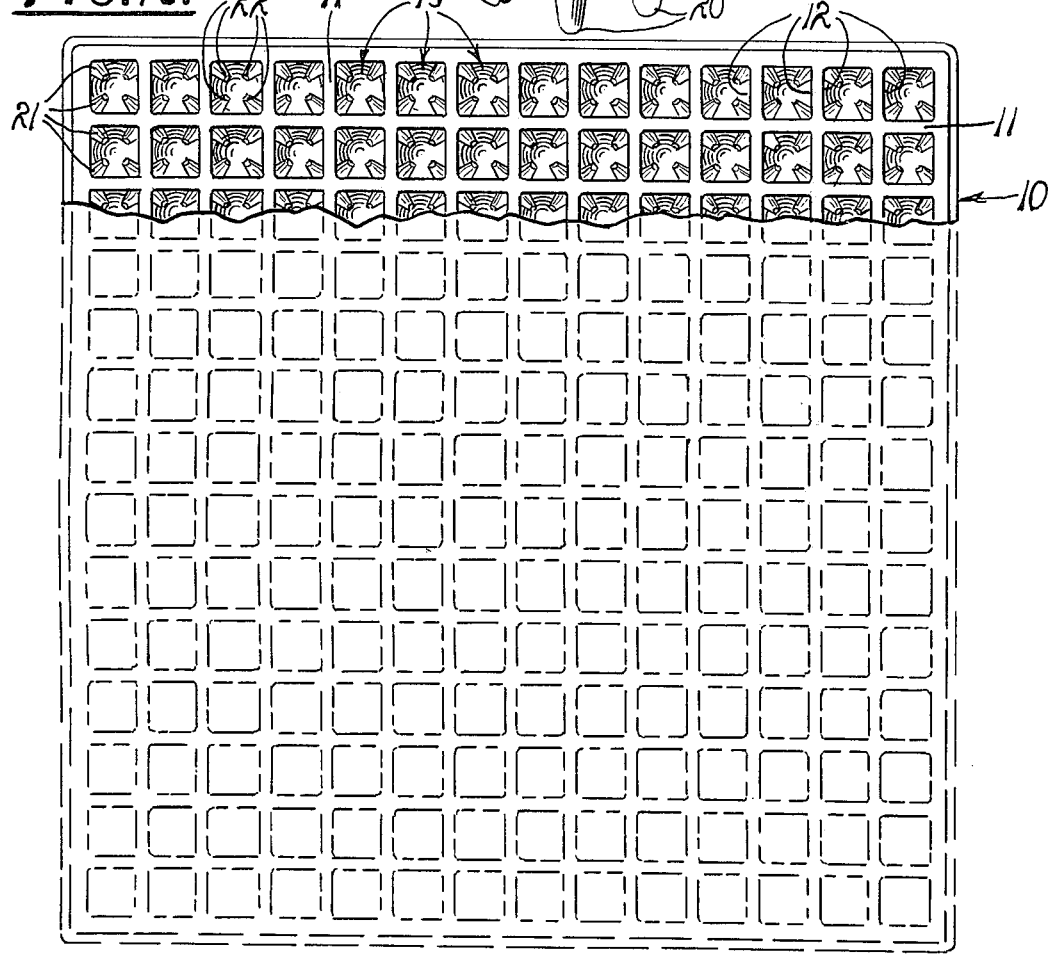

U.S. Patent   Jan. 13, 1976   Sheet 2 of 2   3,931,694
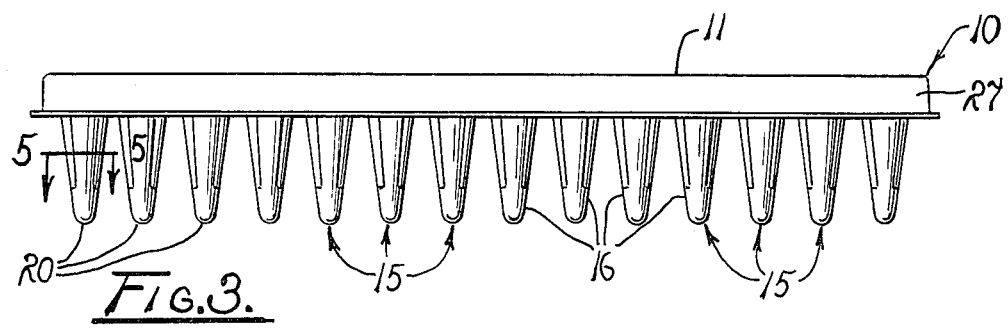
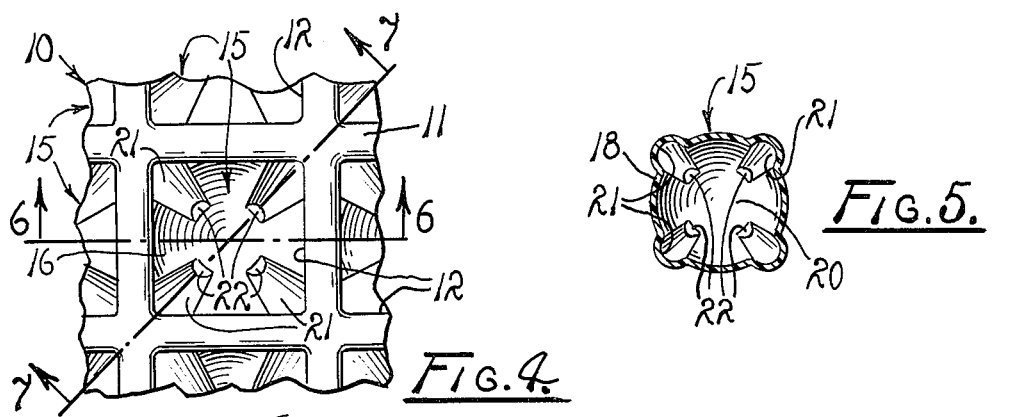
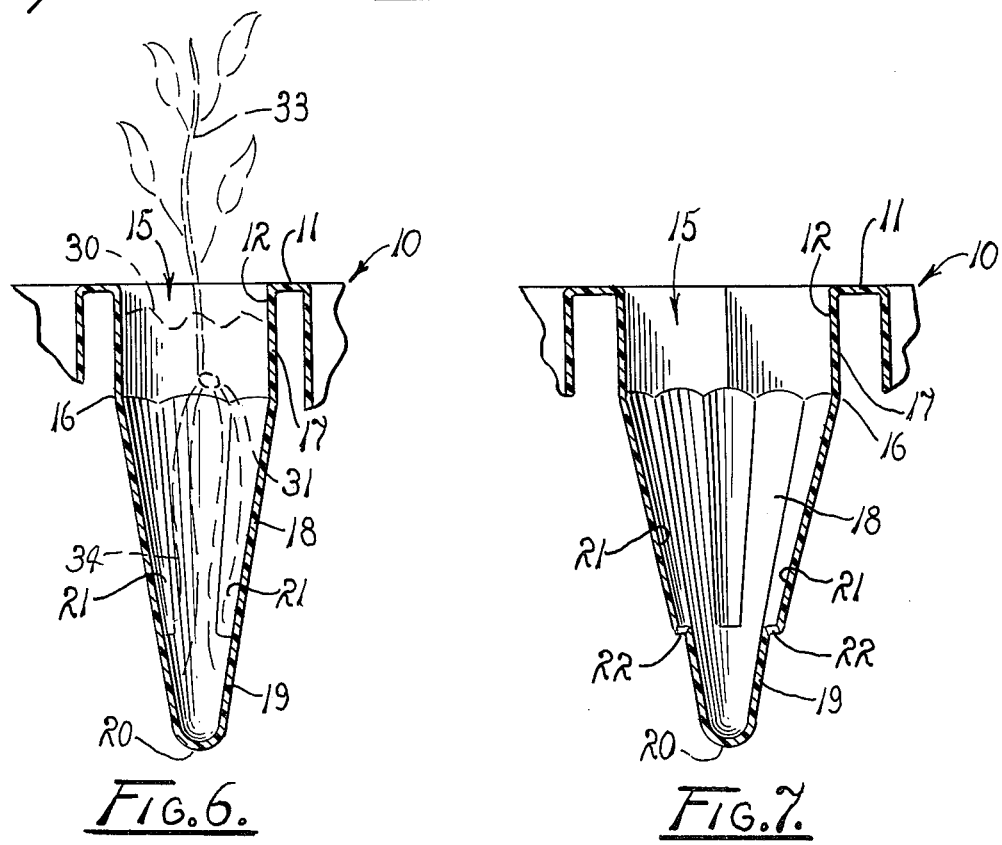

PLANTING FLAT

BACKGROUND OF THE INVENTION

The present invention relates to a planting or seedling flat and more particularly to such a flat having a multiplicity of planting cells providing open upper ends adapted to receive growing medium, seeds, water, fertilizer, and the like; downwardly constricted closed lower ends defining reservoirs for the retention of residual water, fertilizer, and the like accessible to the roots of the plants grown in the cells; and aerating openings disposed above the reservoirs serving the combined purposes of supplying air to the growing medium and providing drainage of water and fertilizer in excess of an amount sufficient to fill the reservoirs.

Planting flats are employed for growing plants from seeds or cuttings. When such plants have reached a given stage of growth, they are taken from such flats and planted in other containers or in open fields. What once was entirely a manual operation of filling such flats with soil or other growing medium, planting the seeds or cuttings, and hand watering the soil has become a highly mechanized procedure. Many field crops, such as tomatoes, are first planted in flats and grown in greenhouses before being transplanted to the open field. In areas in which late frosts are a problem, this procedure permits the farmer to achieve plants of a significant size by the time it is safe to plant them outside and thus prior to exposing them to the hazards of frost, mechanical damage, preditory insects, caterpillars, and the like encountered in the field.

The growing season for plants in flats is usually quite brief. Such plants are required in great numbers at one time, orders for such plants frequently being for millions of the plants at a time. The plants must be healthy, uniform, weed-free and economical. They should be as vigorous and stalky as circumstances permit. They should receive as little root damage as possible during transplanting and must be economical. The saving of even a cent a flat, or one plant per hundred, is a significant saving in commercial operations.

Machines have been developed which accept flats having a multiplicity of receptacles therein, fill the receptacles with disinfected soil or other growing medium, place one seed in each receptacle, cover the seeds, and compact the soil. Such machines have been of great benefit to the industry but the planting flats themselves have suffered from many difficulties which have inspired the present invention.

Prior to the present invention, it has been erroneously believed in the industry that the planting cells of flats must have drainage openings to avoid an objectionable accumulation of salts, over watering, stagnation, or souring. Such openings can be typified by those shown at 34 and 58 in U.S. Pat. No. 3,667,159, at c in U.S. Pat. No. 2,045,189, and at 3 in British Pat. No. 1,034,256. Thus, such drainage openings have been uniformally utilized even though recognized to cause serious troubles. They permit roots to grow downwardly and out through the openings. Such roots are broken off when the plants are removed from the flats thus frequently impairing their survival, aggravating the shock of transplanting, or at least impairing the plants' rate of growth. Further, such drainage openings have been recognized as permitting the rapid escape of irrigation water resulting in the leaching of nutrients from the soil and a requirement for excessively frequent irrigation and fertilization.

The present invention resides in the discovery that drainage openings in the lower ends of planting cells in flats are not only unnecessary but are undesirable.

The invention further resides in the discovery that if such drainage openings are moved upwardly from the lower ends of such planting cells so that the cells have imperforate lower end portions constituting reservoirs beneath such openings a great many advantages accrue. The openings become ventilation openings conducive to superior plant growth. The reservoirs accumulate residual water reducing the frequence of required irrigation. The reservoirs serve to retain fertilizer and other plant nutrient materials in position conveniently accessible to the roots of the growing plants rather than having them leached directly from the soil. Plants grown in such cells are markedly sturdier and stalkier.

Still further, the invention resides in forming such reservoirs so as to have substantially conical lower end portions terminating in hemispherical lower ends which facilitate plant and root mass removal as well as shaping such root masses for more advantageous growth when planted in a field. As the roots of the plant grow downwardly, they are confined so as to form highly desirable root masses or balls. Such plants and root masses with entrapped soil are pulled from such cells, they are much more easily released from the flats. In actual practice, tomato plants only one and one-half to two inches high, two or three weeks after planting, can readily be pulled from the plant cells of the flats of the present invention together with their growing medium while normally such tomato plants need to be about six weeks old and eight or ten inches tall in order to permit satisfactory removal. Two factors are principally involved. There are no bottom drainage openings through which the roots can grow and they make no effort to extend through the elevated drainage or ventilation openings. The protracted presence of water in the reservoir better lubricates the root masses in a wick-like action for extraction from the cells. Additionally, the confined and shaped root masses more quickly become established when transplanted so as to minimize shock and insure growing continuity.

SUMMARY OF THE INVENTION

It is an object of the present invention to provide an improved planting flat.

Another object is to provide a planting flat conducive to the production of superior seedlings and rootings therein.

Another object is to provide a planting flat having facility for the retention of residual water, fertilizer, other plant nutrients and the like in positions conveniently accessible to the roots of the plants growing therein.

Another object is to provide for the ventilation of growing medium in planting flats.

Another object is to provide a planting flat having improved facility for confining and shaping the root masses of plants growing therein.

Another object is to provide a planting flat having planting cells therein from which growing plants can be removed more speedily and easily than from previously known planting flats.

Another object is to reduce the frequency with which plants growing in planting flats must be irrigated and/or fertilized.

Another object is to locate drainage openings in the planting cells of planting flats so as to form a reservoir therebelow for residual water, fertilizer, and the like, to serve drainage purposes when excessive irrigation occurs, and to ventilate soil therein disposed above such openings.

Another object is to provide such a planting flat in which a condition of maximum moisture at the bottoms of cells is maintained to cause the roots of growing plants to form deeper roots.

Another object is to provide such a flat in which the roots are confined and shaped at the positions to which the roots are attracted by such moisture.

Still further objects and advantages are to provide improved elements and arrangements thereof in a planting flat of the character described which is durable, economical, and superior to know flats in performing its intended functions.

BRIEF DESCRIPTION OF DRAWINGS

FIG. 1 is a fragmentary perspective of a planting flat embodying the principles of the present invention and showing a growing plant and its root mass and entrapped soil being pulled from the flat.

FIG. 2 is a top plan view of the flat.

FIG. 3 is a side elevation of the flat of FIG. 2.

FIG. 4 is a somewhat enlarged fragmentary plan view of a cell of the flat of the present invention.

FIG. 5 is a section taken on line 5—5 of FIG. 3.

FIG. 6 is a section taken on line 6—6 of FIG. 4 but showing a plant growing therein in dashed lines.

FIG. 7 is a section taken on line 7—7 of FIG. 4.

DETAILED DESCRIPTION OF THE PREFERRED EMBODIMENT

Referring in greater detail to the drawings, a planting flat embodying the principles of the present invention is shown at 10 consisting of a unitary body of sheet plastic material formed by stamping, die casting or any other suitable procedure from styrene or other suitable heat conductive, light-weight, thin, durable, yet somewhat flexible plastic. The flat provides a substantially square top panel 11 having square openings 12 formed therethrough in rows longitudinally and transversely of the panel. Each opening 12 has a cell 15 formed by side walls 16 integral with the top panel 11. The side walls for each cell define an open upper end 17 in registration with its respective opening 12. Transversely of the cells, the side walls are right-angularly related to form substantially square upper end portions. Opposed side walls of the upper end portions of each cell are extended downwardly from the panel in substantially parallel relation for approximately one-quarter of the length of the cells. From the parallel upper end portions, the side walls downwardly converge, forming a substantially frusto-conical central portion 18 and a frusto-conical lower end portion 19 terminating in a hemispherical lower end 20. The lower end portion 19 is imperforate and constitutes a reservoir for residual water, fertilizer, plant nutrients and the like. While the central portion is substantially frusto-conical, it has elongated inwardly disposed concavities or hollow ribs 21 formed in the side walls which extend from the corners formed by the walls in the upper end 17 downwardly to positions substantially three-quarters of the lengths of the cells where they terminate in openings 22. Such concavities upwardly expand to facilitate plant and growing medium extraction.

To impart greater strength to the panel 11, a skirt 27 integral therewith is downwardly extended along each side of the panel and joined at the corners thereof. In their downward extension, the skirts somewhat outwardly extend to facilitate removal of the flats from the dies, not shown, in which they are formed and to permit a multiplicity of flats to be compactly stored or transported in nested relation.

The top panel 11 and the lower ends 20 of the cells 15 are disposed in substantially parallel planes. Being imperforate, the lower ends provide dependable support for the flat 10 when rested on a table, bench, or other supporting surface.

The ventilating openings 22 are disposed in a plane between the plane of the top panel 11 and the lower ends 20 and approximately one-fourth of the distance between said planes from the plane of the lower ends.

OPERATION

The operation of the described embodiment of the present invention is believed to be clearly apparent and is briefly summarized at this point. Growing medium 30 is deposited in the cells 15 through the upper ends 17 and fills such cells to their tops or nearly thereto. Such medium may take the form of soil, vermiculite, peat moss, sand, or the like, and any desired combination thereof. A single seed 31 is positioned in the growing medium of each cell and the growing medium compacted thereover. While the filling of the cells, the planting of the seeds, and the compacting of the growing medium may be manually performed, in commercial operations it is accomplished by automatic machinery, not shown, available for the purpose.

The flats 10 are then sprinkled. In most hot house operations, such sprinkling must be repeated two or more times a day and is frequently accomplished by time clock actuation of suitable sprinkling equipment.

As spray descends on the growing medium 30 in the cells 15, it soaks downwardly, thoroughly moistening the growing medium and the seeds 31 and excess or residual amounts are collected in the reservoirs provided in the lower end portions 19. Between irrigations, the reservoirs contain residual quantities of water and the growing medium extended therein acts as a wick or capillary attractor maintaining the seed in the desired moistened condition. When it is desired to provide fertilizer or other plant nutrients to the growing medium, it is simply added to the irrigation water. In such event, such fertilizer or other plant nutrient material is also found in the reservoirs together with the residual water for utilization between irrigations. This achieves a continuity of irrigation and plant feeding unknown in prior flats.

As discussed, prior to the present invention, it was considered absolutely essential to provide lower drainage openings in planting flats to avoid the accumulation of excessive salts, over watering, stagnation or souring. However, it has been found that plants grown in the flat of the present invention having the described reservoirs at the lower end portions 19 of the cells 15, are at the end of six weeks approximately fifty percent (50%) larger in caliber than the same kind of plants sown in the same planting medium but having the described drainage openings through which water, fertilizer, and plant nutrient material drain. This is believed to be due primarily to the continual provision of adequate moisture by the wick effect of the growing medium disposed in the water, fertilizer, and/or plant nutrient material in the reservoirs. However, several additional factors are involved. First, the plants are produced so quickly that they are normally now available for field planting in approximately six weeks after the seeds 31 are deposited in the planting medium 30. Second, the location of the ventilating openings 22 limit the maximum amount of residual water, fertilizer and plant nutrient material that can be retained in the reservoirs during irrigation. Third, the openings 22 admit air to the planting medium so that even though it is maintained in a continuously moist condition, it is also continually aerated in a manner which has proved highly conducive to effective plant growth.

After the seeds 31 germinate, they produce plants 33 which have root systems 34 which, as they descend from the seeds through the growing medium, are constrained by the downwardly converging side walls 16 until entering the frusto-conical lower end portions 19 in which they form compact root masses conducive to ease of transplation and effective plant growth after transplation.

As best shown in FIG. 1, to remove the plants 33 from the cells 15, the plants are grapsed by an attendant who pulls upwardly on them and easily withdraws the growing medium now bound in the root systems 24 from the flat 10. Since there are no drainage openings in the lower ends 20, the tap roots of the plants do not extend from the cells and thus do not inhibit plant withdrawal and cannot be damaged by such withdrawal. In practice, it is found that no significant portions of the root systems 34 extend from the openings 22. Such openings remain open and continue to provide their aerating effect as well as their controlled limitation of the maximum amount of residual water and the like retained in the reservoirs. Further, the absence of drainage openings in the lower ends 20 of the cells 15 permit the flats to be rested on any suitable supporting surface while the plants are withdrawn from their cells or for storing or growing purposes.

Although the cells 15 are usually die cast, their ultimate form is that of sheet material of the described form. Such sheet material is resiliently flexible. Since the walls 16 diverge upwardly until reaching their parallel upper end portions 17 and even the elongated concavities 21 upwardly distend, the root systems 34 of the plants 33 are easily removed from the cells. However, if the growing medium 30 and root systems 34 are adherent to the side walls due to the use of an improper growing medium or the like, the root systems are readily loosened by flexing the flat 10 in a brief and limited twisting action whereupon even the most tightly adherent root systems are easily withdrawn.

With conventional flats, a four-hour delay in either of the two normally scheduled daily waterings almost always causes tip burn and other damage to the plants. The flats of the present invention have gone an entire day without watering with no significant damage to plants growing therein under the same environmental conditions. With conventional flats, it is the practice to fertilize twice a day with each of the two irrigations. With the flat of the present invention, residual fertilizer and water are retained in the reservoirs 19 and are not simply leached from the growing medium 30. Thus, less fertilizer is needed, since less is wasted, permitting a substantial saving.

In view of the foregoing, it will be evident that the flats of the present invention permit the growing of superior plants, with less attention, less water, less fertilizer, less hazard, less expense, and less loss during transplanation. Plants produced in the flats of the present invention are more easily removed, more easily replanted and grow more nearly continuously when replanted than those permitting roots to emerge from drainage openings in the flats in which they are germinated.

Although I have herein shown and described my invention in which I have conceived to be the most practical and preferred embodiment, it is recognized that departures may be made therefrom within the scope of my invention.

Having described my invention, what I claim as new and desire to secure by Letters Patent is:

1. A planting flat comprising a unitary body of sheet material having a plurality of downwardly tapering cells of a common vertical length having open upper ends and closed lower ends disposed in respective upper and lower substantially parallel planes, an upper panel interconnecting the upper ends of said cells into rows that are of substantially parallel adjacent relationship, each unitary cell having a transversely substantially square upper portion defined by vertically substantially parallel, right angularly related pairs of oppositely disposed walls, and having substantially frusto-conical unitary central and lower portions continuous with the walls of said upper portion and tapering uniformly downwardly along a common longitudinal axis from the upper square portion to a closed lower end, the central portion being defined by a plurality of unitary longitudinally extending concave reinforcing ribs extending downwardly from each corner of said square upper portion to said lower portion to enhance the rigidity of said central portion, said ribs extending radially beyond the taper of said central portion and defining openings at their lower ends spaced outwardly from the remaining tapered lower portion whereby excess water can drain from said cell, said openings being upwardly spaced in relation to said lower portion of the cell, the tapered lower portion below the openings being inperforate to define a reservoir therein.

2. The planting flat of claim 1 in which the ribs are frusto-conical and constrict downwardly.

* * * * *